United States Patent
Johnson et al.

(10) Patent No.: US 8,414,245 B2
(45) Date of Patent: Apr. 9, 2013

(54) CONTAINER TRANSFER SYSTEM FOR UPLOADING AND DOWNLOADING MATING CONTAINER RELATIVE TO A TRANSPORT VEHICLE

(75) Inventors: Jack M. Johnson, Auburn, AL (US); Matt Romito, Opelika, AL (US)

(73) Assignee: Express Mobile Storage Holding, LLC, Auburn, AL (US)

( * ) Notice: Subject to any disclaimer, the term of this patent is extended or adjusted under 35 U.S.C. 154(b) by 685 days.

(21) Appl. No.: 12/585,796

(22) Filed: Sep. 24, 2009

(65) Prior Publication Data

US 2010/0086389 A1    Apr. 8, 2010

Related U.S. Application Data

(60) Provisional application No. 61/136,780, filed on Oct. 2, 2008.

(51) Int. Cl.
*B60P 1/00*    (2006.01)

(52) U.S. Cl.
USPC ........................................................ 414/549

(58) Field of Classification Search .................. 414/458, 414/459, 475, 498, 546, 558
See application file for complete search history.

(56) References Cited

U.S. PATENT DOCUMENTS

| | | | | |
|---|---|---|---|---|
| 2,848,123 | A * | 8/1958 | Keys | 414/549 |
| 3,523,620 | A * | 8/1970 | Klaus | 414/546 |
| 3,874,528 | A * | 4/1975 | Bottenschein | 414/549 |
| 4,019,642 | A * | 4/1977 | Hammar | 414/546 |
| 4,778,327 | A * | 10/1988 | Tufenkian et al. | 414/541 |
| 4,930,972 | A * | 6/1990 | Little | 414/549 |
| 5,007,792 | A * | 4/1991 | Wiedeck et al. | 414/500 |
| 5,284,226 | A | 2/1994 | Makimura et al. | |
| 6,155,770 | A * | 12/2000 | Warhurst | 414/498 |
| 6,186,713 | B1 | 2/2001 | Bonerb | |
| 6,619,904 | B1 | 9/2003 | Barry | |
| 7,270,511 | B2 * | 9/2007 | Lockamy et al. | 414/549 |
| 7,942,621 | B2 * | 5/2011 | Bain et al. | 414/498 |
| 2007/0071586 | A1 * | 3/2007 | Born et al. | 414/549 |
| 2008/0056870 | A1 | 3/2008 | Cullum et al. | |

* cited by examiner

*Primary Examiner* — Joshua Rudawitz
(74) *Attorney, Agent, or Firm* — Dykema Gossett PLLC

(57) ABSTRACT

A container transfer system for a transport vehicle includes a lift assembly which has spaced lift lugs that can extend into spaced recesses in the floor of a mating storage container and attachment straps that respectively extend from opposite ends of a mast to connection elements on the respective sides of the container to connect the container to the lift assembly and enable the lift assembly to lift the container onto the vehicle for transport to another location and thereafter download the container off the vehicle.

16 Claims, 12 Drawing Sheets

CONTAINER TRANSFER SYSTEM FOR UPLOADING AND DOWNLOADING MATING CONTAINER RELATIVE TO A TRANSPORT VEHICLE

CROSS-REFERENCE TO RELATED APPLICATION

This application derives from U.S. Provisional Application No. 61/136,780, filed Oct. 2, 2008, the priority of which is hereby claimed.

BACKGROUND OF INVENTION

The invention relates to mechanisms for lifting storage containers onto transport vehicles for delivery from one location to another, primarily in the mobile storage industry. Known mechanisms include those disclosed in U.S. Pat. Nos. 6,071,062 and 6,155,770 to PODS, Inc. of Clearwater, Fla., and U.S. Pat. Nos. 7,074,004, 7,241,100, 7,264,437 and 7,270,511 to Pak-Rat Mini-Movers, LLC of Wake Forest, N.C.

In certain known mechanisms, the load begins to sway as the container is suspended with chains from a structure on wheels that surrounds the container and which is propelled via a mounted gas engine that travels with the structure and hydraulically drives each wheel of the structure. The structure is wide, causing the wheels to be wider than the truck by as much as a couple of feet on each side of the container, thus the structure cannot move up driveways that are landscaped along its edges or along narrow passages. This lift has overhead clearance problems with power lines, etc. The lift cannot travel on steep slopes. The lift is heavy, expensive, cumbersome and slow.

Other known mechanisms utilize very long cantilever fork lift arms, which makes the equipment very heavy.

In still further mechanisms heavy, high maintenance triple acting hydraulic cylinders are used to push-pull a carriage horizontally. The lift employs cantilever arms that come alongside the container as the lift moves to the rear of the truck. These arms however rotate at a pivot point on the carriage downward to attach chains to the container's bottom edge. Once attached, the arms rotate upward to lift the container. These arms have a cylinder on their end to tilt the container to keep it level.

It is an object of the present invention to provide a container transfer system for uploading and downloading containers relative to a transport vehicle which are simpler in construction, less expensive and more reliable, and which allows the containers to be a full 8' in width.

It is also an object of this invention to provide a mating storage container that cooperates with the container transfer system.

These and other objects are achieved with a transfer system that employs a unique interconnection apparatus that avoids use of long cantilever arms that must be extended to the sides of containers, thus enabling the container to be constructed to have a full 8' width and still be positionable on the bed of the transport vehicle.

Further features and advantages of the invention will become clear from a review of the accompanying drawings, taken in conjunction with the following discussion.

DETAILED DESCRIPTION OF THE PREFERRED EMBODIMENT

Figure 1:
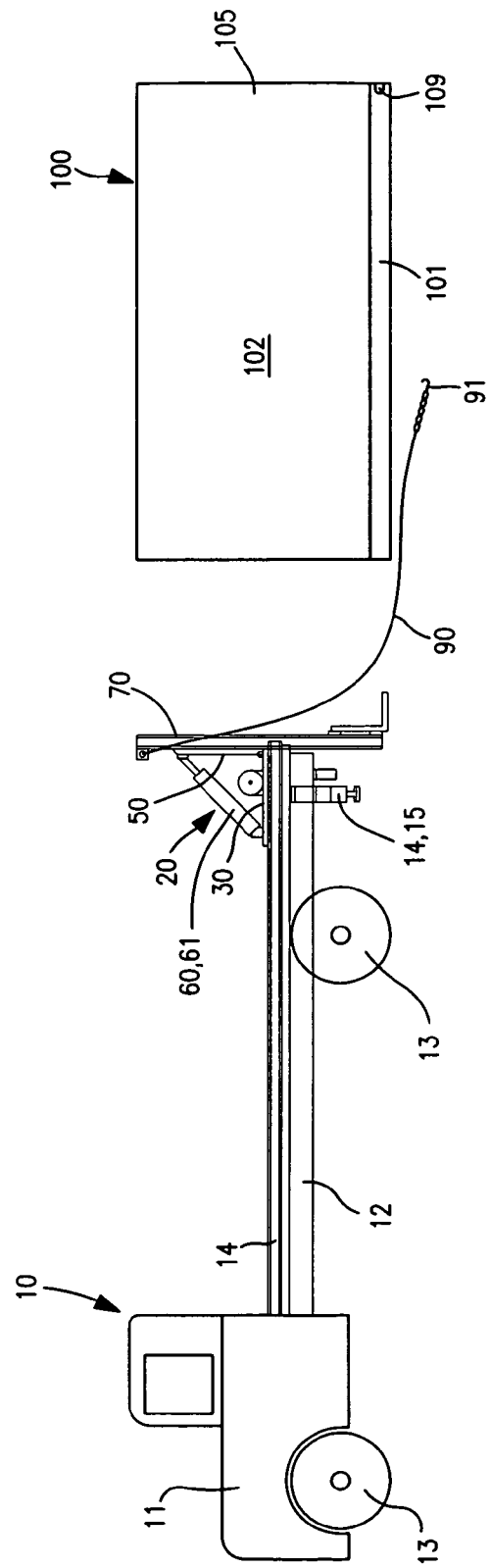
FIG. 1 is a schematic left side view of a transport vehicle with container transfer system according to the present invention, the transport vehicle being shown near the rear end of a mating storage container constructed to be lifted up and onto the transport vehicle by the container transfer system for transport to another location, and thereafter off loaded therefrom.

FIG. 1 shows a transfer vehicle 10 with a container transfer system 20 according to the present invention. It also shows a mating container 100 which is constructed to be attached to and lifted onto transport vehicle by the container transfer system 20 when the container is to be moved from one location to another, and then, lowered and detached when the container is to be deposited at the new location.

Figure 11:
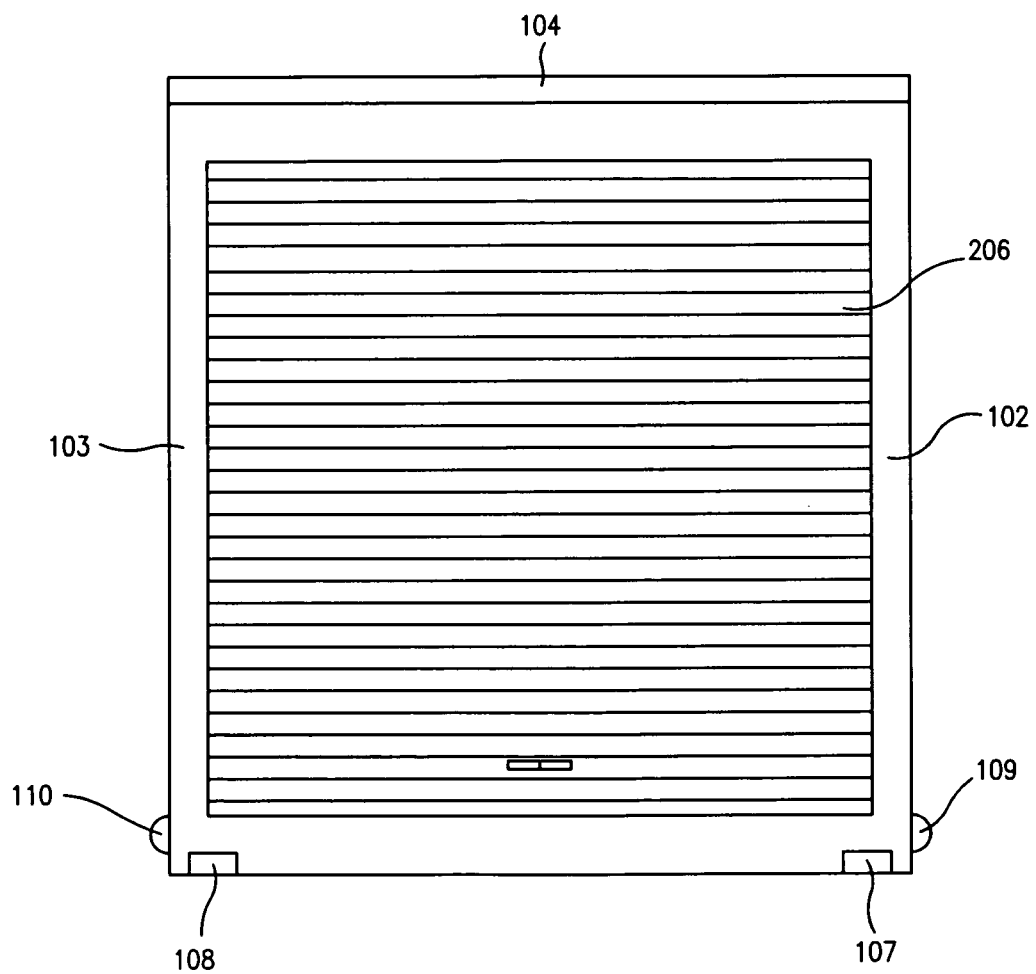
FIG. 11 is an enlarged view of the rear end view of the container.

Referring first to the container 100, it has a reinforced floor 101, side walls 102 and 103 (see FIG. 11), a ceiling 104, a front wall 105 and a door 206 which can open and close an opening at the rear end of the container. Blind recesses 107 and 108 are formed in opposite sides the floor 101 at its rear end for the insertion of lifting lugs of the container transfer system. Attachment means, shown in the form of D rings 109 and 110, are mounted on the sides of the floor 101 at its front end for attachment of respective straps used to connect the container to the container transfer system (see FIG. 12).

The transport vehicle 10 includes a cab 11, a bed 12 which is in the form of a open frame, and wheels 13. It also includes outriggers 14, and 15 beneath opposite sides of the bed near its rear end.

The container transfer system includes a carriage 30, a guide assembly 50 which is mounted on the carriage, and a lift assembly 70 which is movably positioned relative to the guide assembly. It also includes support rails 21 and 22 which are mounted on the vehicle bed 12 to extend longitudinally of the vehicle, and drive chains 23 and 24 which are connected at their ends by threaded bolts (not shown) to the bed 12 and extend longitudinally of the vehicle between the support rails.

Figure 6:
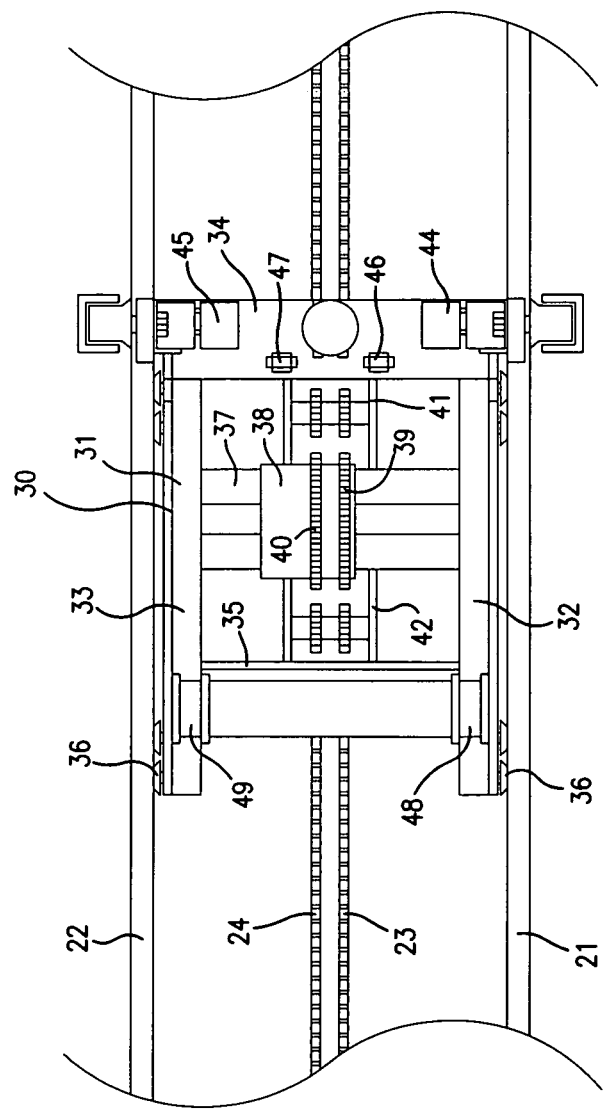
FIG. 6 is a partial top plan view of the container transfer system, some elements omitted for purposes of clarity.

As best seen in FIG. 6, the carriage 30 includes a base frame 31 provided by side members 32 and 33, front cross member 34 and rear cross member 35. The side members mount casters 36 which extend into longitudinal channels in the support rails 21 and 22. A hydraulic drive motor 37 and a gear box 38 having drive sprocket wheels 39 and 40 are mounted between the side members. Idler sprocket assemblies 41 and 42 having dual idler sprockets are respectively connected between the gear box 38 and the front and rear cross members 34 and 35. The drive chains 23 and 24 engage the idler sprockets of the idler sprocket assemblies at their lower peripheries and then engage the teeth of the drive sprockets 39 and 40 and extend up and over the gear box 38. Operation of the hydraulic drive motor 37 with rotation of the drive sprockets 39 and 40 will cause the carriage base frame 31 to move in one direction or another along the support rails 21 and 22.

Figure 7:
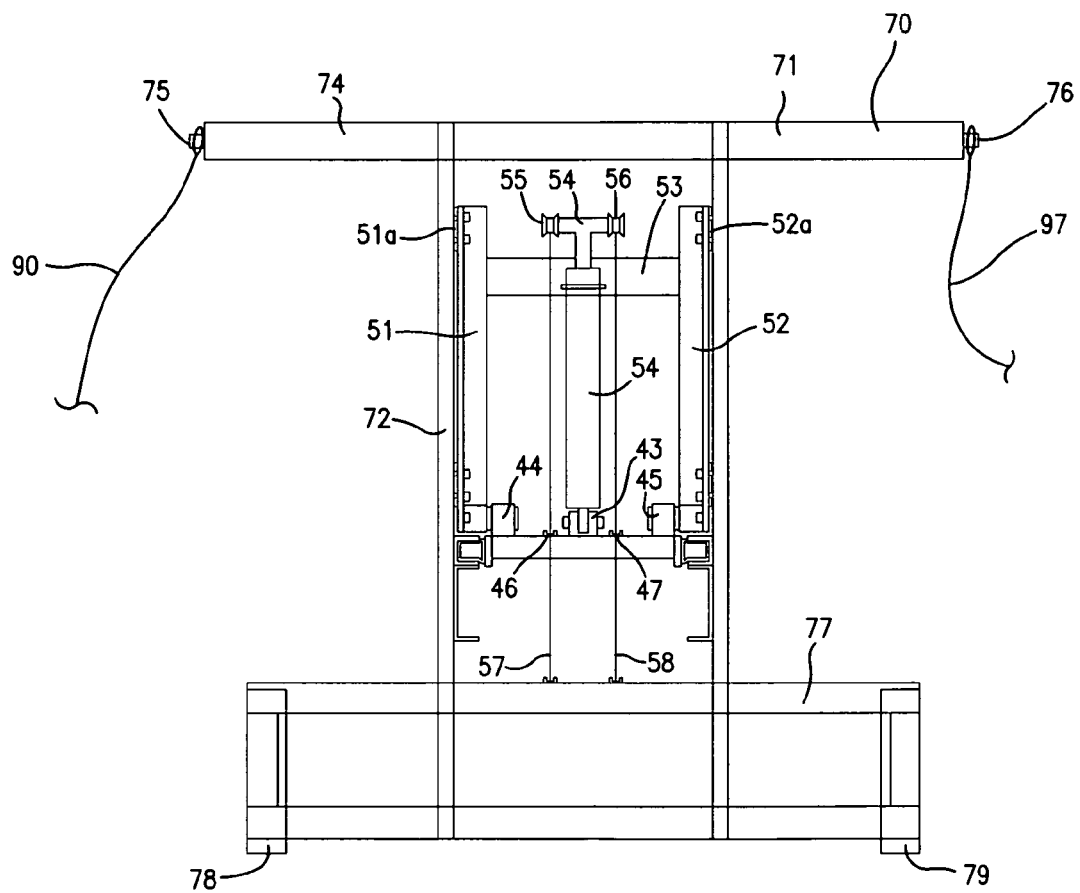
FIG. 7 is a rear view of the container transfer system.

Centrally located on the front cross member 34 is a mount 43 (see FIG. 7), and on opposite sides thereof are mounting blocks 44 and 45.

Also located on the front cross member 33 are left and right chain anchors 46 and 47 (the purpose of these becoming clear below). The rear cross member 34 includes hydraulic cylinder mounts 48 and 49 at its opposite ends.

The guide assembly 50 includes a guide frame formed by guide rails 51 and 52 (see FIG. 7), which are respectively pivotally attached at their lower ends to the pivot blocks 44 and 45, and a cross member 53. The guide rails mount casters 51a and 52a which extend laterally outwardly therefrom. A hydraulic cylinder 54 is attached at its lower end to the mount 43 and near its upper end to the cross member 53. A T-shaped rod 54a connected to a piston (not shown) in the hydraulic cylinder extends from the upper end of the hydraulic cylinder. The opposite ends of the cross element of the T-shaped rod include respective guide rollers 55 and 56 for lift chains 57 and 58. These lift chains are respectively attached at first ends to the chain anchors 46 and 47, and then extend up and over respective guide rollers 55 and 56. Opposite second ends of the lift chains are connected to the lift assembly 70. The lift assembly 70 will be raised or lowered relative to the guide frame 50 based on extension or retraction of the T-shaped rod 55 from the hydraulic cylinder 54.

Hydraulic cylinders 60 and 61 are connected between the mounts 48 and 49 and upper ends of the guide rails 51 and 52 to control the vertical orientation of the guide frame.

The lift assembly 70 includes a lift frame 71 and attachment straps 90 and 97. The lift frame 71 includes parallel lift rails 72 and 73, a mast 74, and a lower frame 77 with lift lugs 78 and 79. The lift lugs are sized and shaped so as to fit into the respective blind recesses 107 and 108 of the container 100. They are generally 10-14 inches in length. The mast 74 includes respective mast studs 75 and 76 at its opposite ends for mounting respective first ends of the attachment straps 90 and 97 (see FIG. 12). The mast studs 75 and 76 are spaced a distance about equal to the distance between D-rings 109 and 110 on the container 100. They include radial bores for retaining pins (not shown). The lift rails 72 and 73 include longitudinal channels for the casters 51a and 52a to enable the lift frame to be guided along the guide frame. The lift chains 57 and 58 are attached to the lower frame 77 to lift and lower the lift frame based on operation of the hydraulic cylinder 54.

Figure 8:
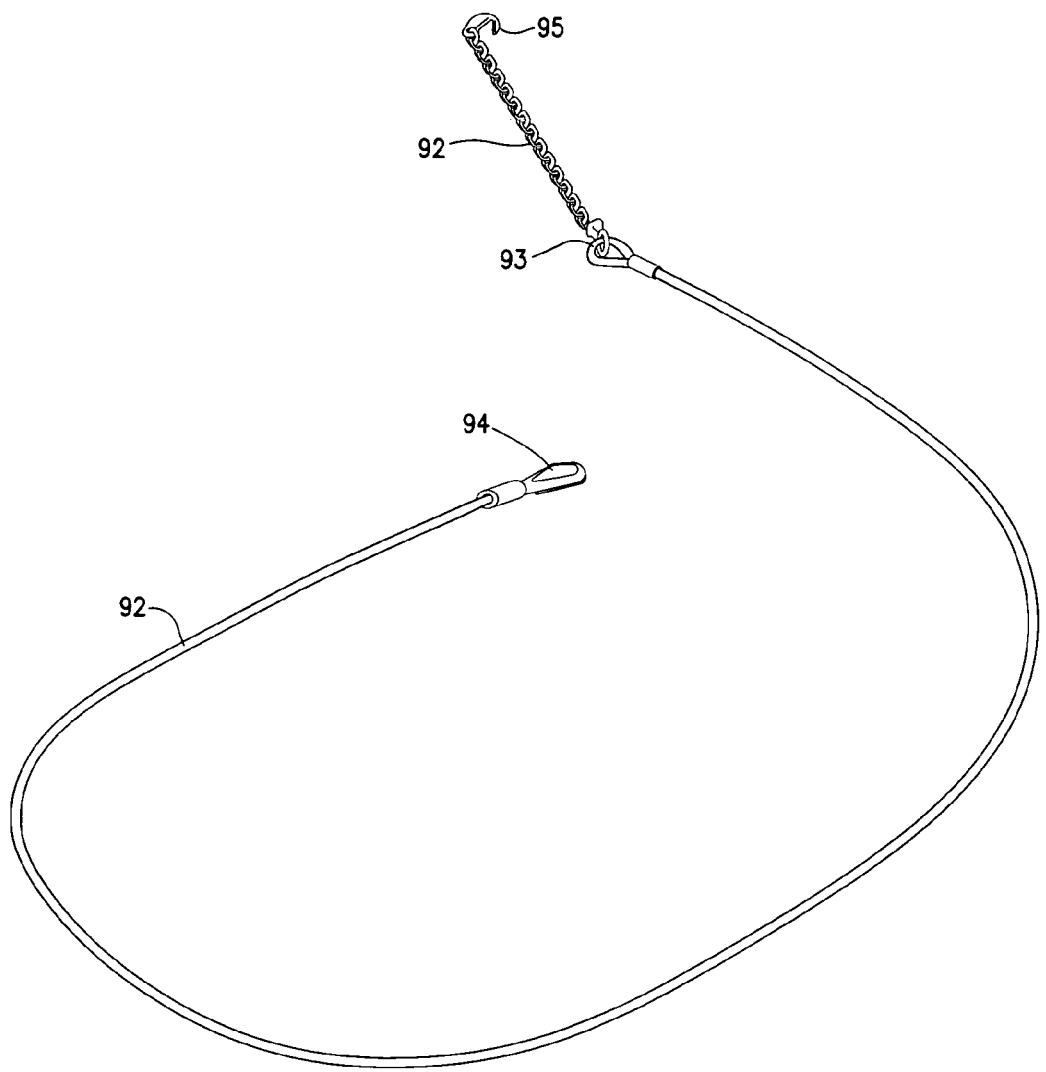
FIG. 8 is a view of a flexible attachment strap of the lift assembly of the container transfer system.
Figure 9:
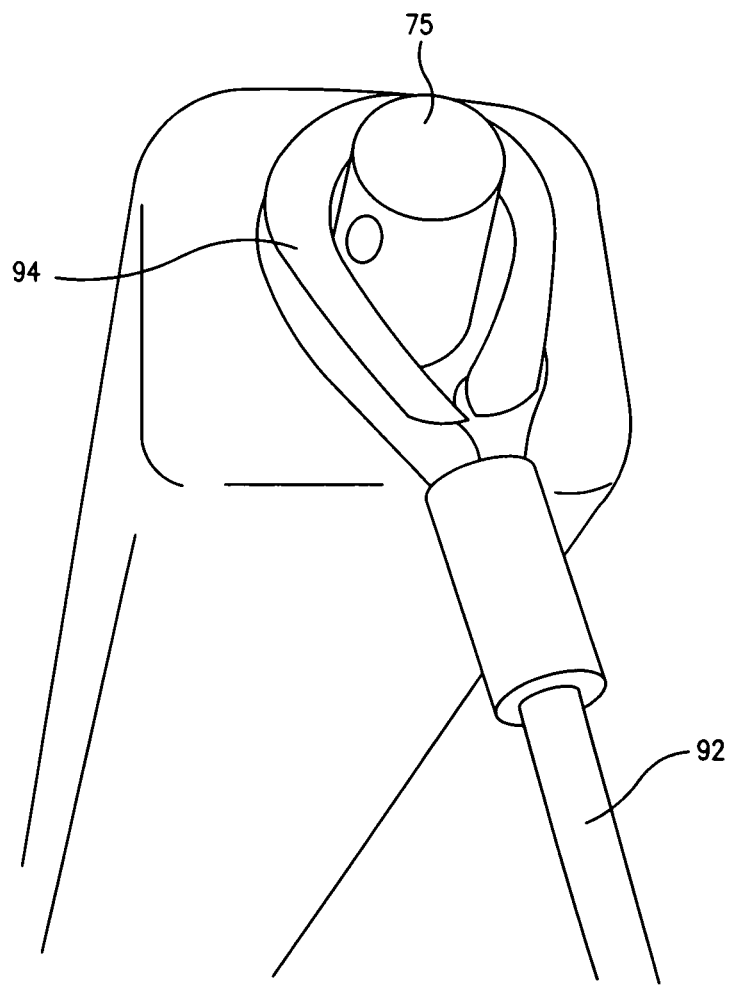
FIG. 9 is a view of the first end of the flexible attachment strap and its connection to one end of the mast of the lift assembly.
Figure 12:
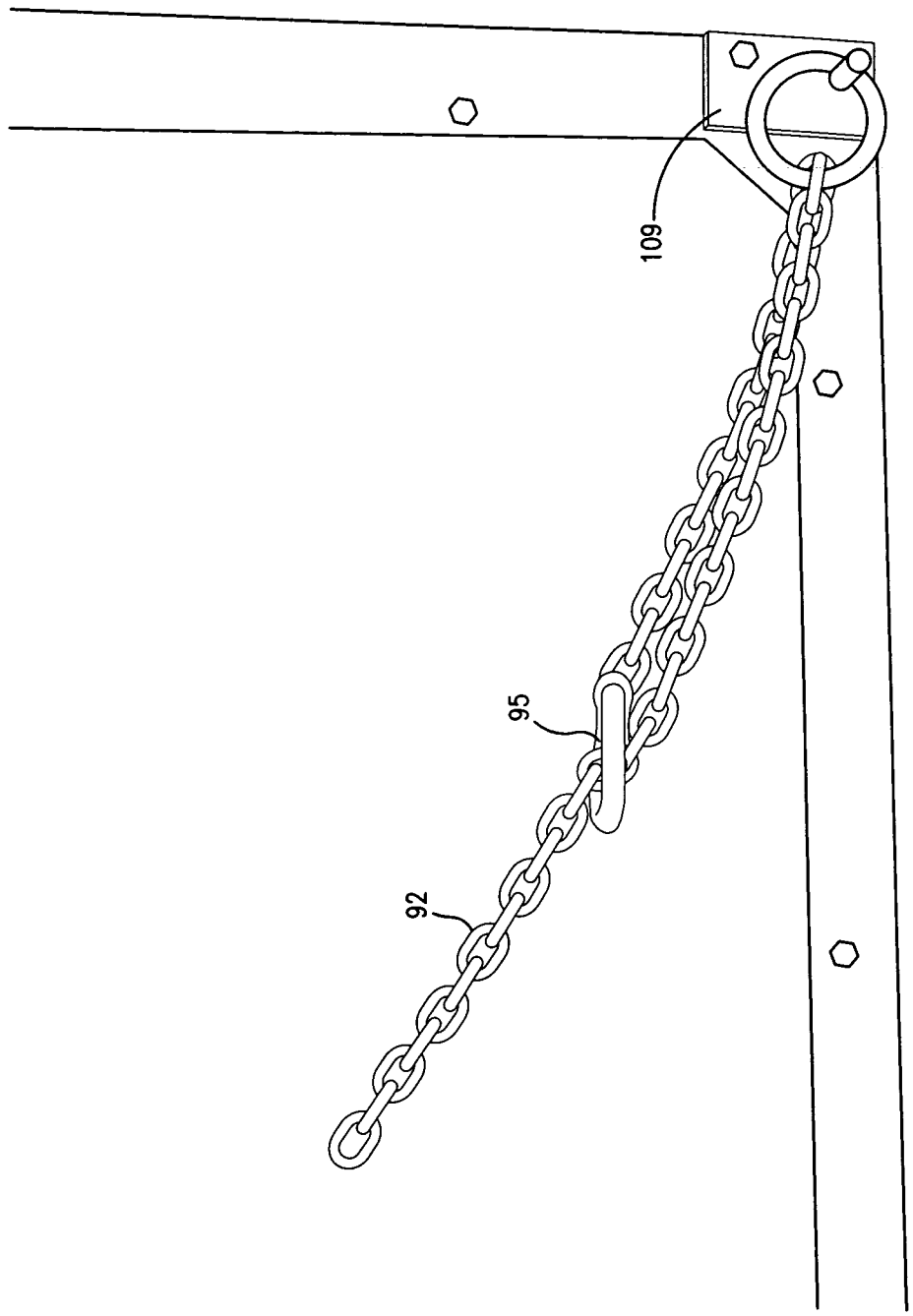
FIG. 12 is a side view of the container showing a second end of a flexible strap connected to the D-ring attachment at a front end side of its floor.

As shown in FIG. 8, the attachment strap 90 includes a steel cable 91 attached to a chain 92 by a connector 93, the steel cable having a eye loop 94 at its end remote from the connector 93 (first end of attachment strap) and the chain having a hook 95 at its end remote from the connector 93 (second end of attachment strap). As shown in FIG. 9, the eye loop 94 is positioned on the mast stud 75 (a retaining pin (not shown) being inserted in the radial bore in the mast stud), and the chain 92 is looped through the D-ring 109 as shown in FIG. 12 and connected to itself by the hook 95. The attachment strap 97 is correspondingly constructed and attached between the mast stud 76 and the D-ring 110.

Figure 2:
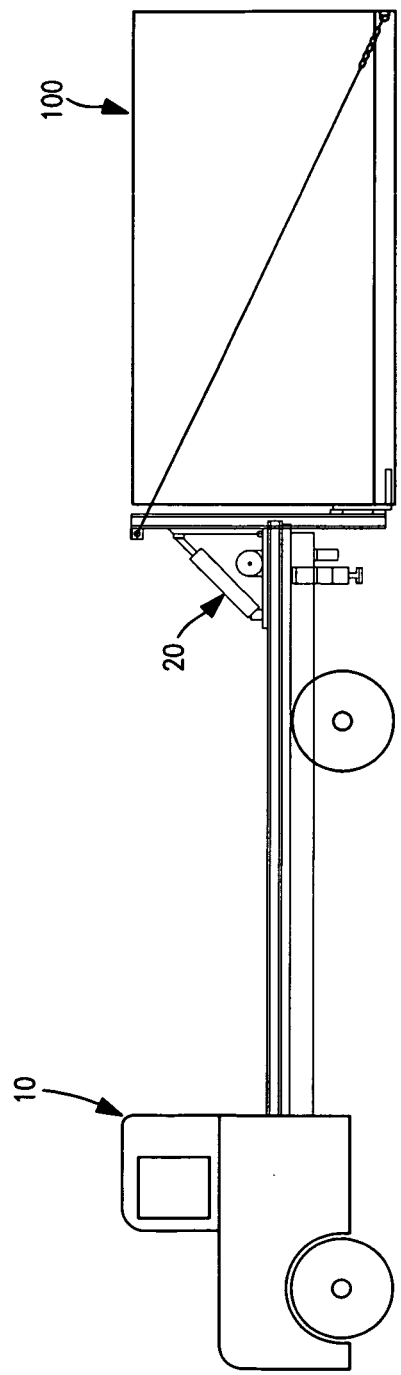
FIG. 2 is a view similar to FIG. 1 but wherein the transport vehicle has been backed up to be adjacent the rear end of the container and the container transfer system is engaged with and strapped to the container.
Figure 3:
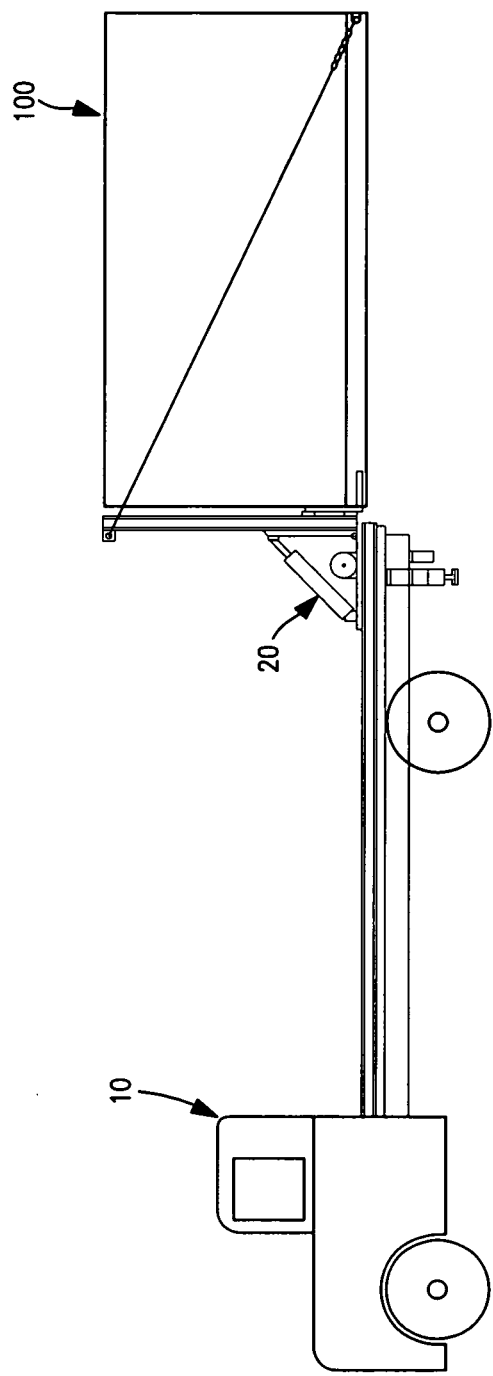
FIG. 3 is a view similar to FIG. 2 but wherein the container transfer system has been operated to lift the container to a level above the bed of the transport vehicle.
Figure 4:
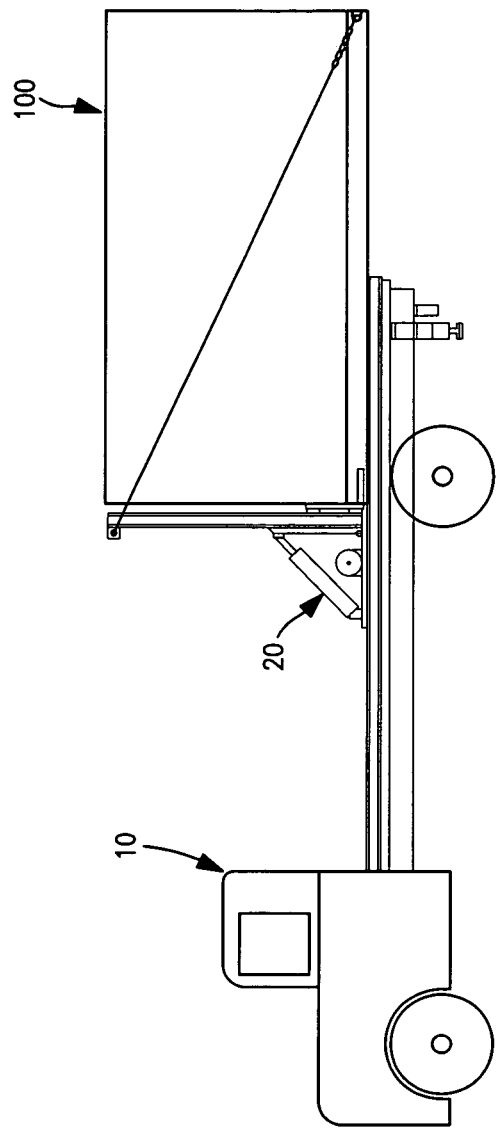
FIG. 4 is a view similar to FIG. 3 but wherein the container transfer system has moved the container part way forward along the bed of the transport vehicle and towards its cab.
Figure 5:
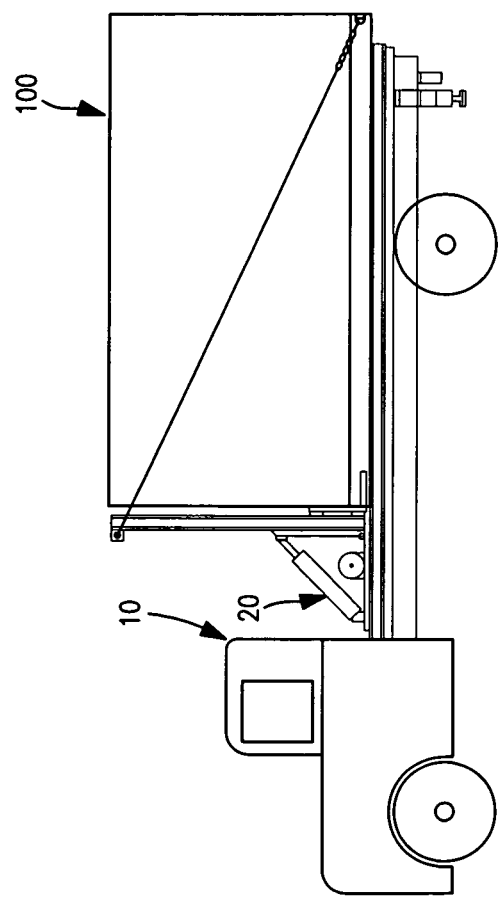
FIG. 5 is a view similar to FIG. 4 but wherein the container transfer system has moved the container to a maximum forward location along the bed of the transport vehicle.
Figure 10:
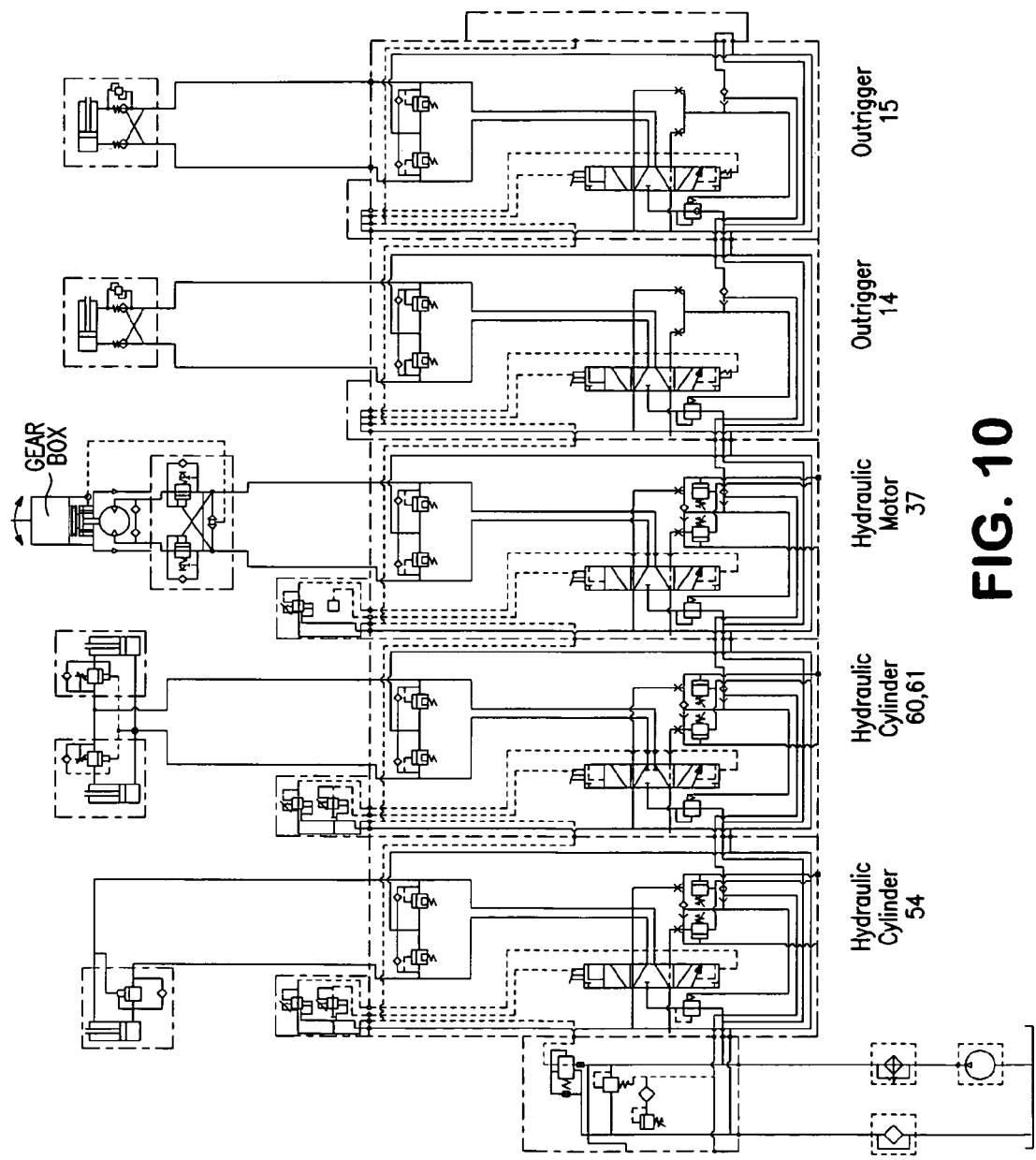
FIG. 10 is a diagram of the hydraulic operating system of the container transfer system.

In use, the transport vehicle 10 is positioned in alignment with the rear end of the container 100 and the hydraulic motor 37 operated by hydraulic operating system shown in FIG. 10 to move the carriage 30 along the support rails 21, 22 to the rear end of the vehicle, where it contacts stop lugs (not shown) on the bed 12. Then hydraulic cylinder 54 is operated to lower the lift assembly 70 until lift lugs 78 and 79 are aligned with the blind recesses 107 and 108 in the container 100. The vehicle is then backed up until the lift lugs 78 and 79 extend into the blind recesses 107 and 108 and the outriggers 14 and 15 lowered to ground. The flexible straps 90 and 97 are then respectively attached between the mast studs 75 and 76 and the D rings 109 and 110 to attach the container to the lift frame. Then the hydraulic cylinder 54 is operated to extend the T-rod 55 relative to the cylinder 54 and thereby lift the lift frame (and container 100) along the guide frame until the container is located above the bed 12 (see FIG. 2). The hydraulic motor 37 is operated to move the carriage 30 to the front end of the vehicle (see FIGS. 4 and 5). The hydraulic cylinder 54 is operated to lower the container 100 onto the support rails 21 and 22. The container is then fixed in position using conventional cinch down straps. The vehicle can then drive to another location for drop off of the container in a reverse operation of the container transfer system. The hydraulic cylinders 60 and 61 are operated when needed to maintain the guide frame (and thus the lift frame) at a vertical orientation.

Although a detailed description of a preferred embodiment of the invention has been provided, changes therein can be made and still fall within the scope of the appended claims. For example, the attachment straps 90 and 97 could each be a single rigid element or a plurality of interconnected rigid elements connected between the mast and suitable attachment means on the respective sides of the container. In addition, a single drive chain could be used instead of the twin drive chains 23 and 24.

We claim:

1. A container transfer system for a transport vehicle having a bed which comprises:

a first support rail for attachment to the bed of the transport vehicle, a carriage which is movable along said first support rail, a guide assembly mounted on the carriage, said guide assembly including a guide frame comprising parallel guide rails and a hydraulic lift cylinder, and a lift assembly movably positioned relative to the guide frame of the guide assembly, said lift assembly including a lift frame formed of parallel lift rails, a mast which extends across the parallel lift rails near upper ends thereof, and a lower frame which extends across the parallel lift rails near lower ends thereof, said parallel lift rails being movable along said parallel guide rails, said lower frame including elongated lift lugs for insertion in blind recesses in a floor of a container to be transferred, and attachment straps at opposite ends of the mast for attachment to opposite sides of the container to be transferred, said lift assembly being movable along said guide rails by said hydraulic lift cylinder.

2. The container transfer system as defined in claim 1, wherein said carriage includes side members, front and rear cross members, and first and second pivot blocks on said front cross member.

3. The container transfer system as defined in claim 2, wherein lower ends of said parallel guide rails are respectively pivotally connected to said first and second pivot blocks, and including a cross member extending between said parallel guide rails.

4. The container transfer system as defined in claim 3, wherein a lower end of said hydraulic lift cylinder is attached to said front cross member and has a T-shaped rod extending from an upper end thereof, and including two lift chains attached at first ends thereof to said front cross member, extending over said T-shaped rod and attached at second ends thereof to said lift frame to lift and lower said lift assembly with extension or retraction of said T-shaped rod relative to said hydraulic lift cylinder.

5. The container transfer system as defined in claim 4, wherein said guide rails include casters extending outwardly therefrom and into longitudinal channels in said respective lift rails.

6. The container transfer system as defined in claim 3, wherein said guide assembly includes left and right hydraulic cylinders extending between said rear cross member of said carriage and respective left and right guide rails for controlling vertical orientation of said guide frame.

7. The container transfer system as defined in claim 2, including a second support rail, and wherein said side members include casters which extend into longitudinal channels in said respective first and second support rails.

8. The container transfer system as defined in claim 7, including a drive chain for attachment to the bed of the vehicle, and wherein said carriage includes a hydraulic motor and a gear box with a sprocket wheel engaged with said drive chain to move said carriage along said first and second support rails.

9. The container transfer system as defined in claim 1, wherein said upper mast includes mast studs at opposite ends thereof, and first ends of said attachment straps are connected to respective mast studs.

10. The container transfer system as defined in claim 9, wherein each of said attachment straps is flexible.

11. The container transfer system as defined in claim 10, wherein each of said attachment straps includes a steel cable connected to a chain.

12. The container transfer system as defined in claim 11, wherein each said steel cable includes an eye loop at a free end for attachment to a mast stud and each chain includes a hook at a free end for enabling attachment to the container.

13. The container transfer system as defined in claim 1, wherein said lift lugs are between 10 and 14 inches in length.

14. A storage container for use with a container transfer system, as claimed in claim 1, said container comprising a floor member, left and right side members, a ceiling member, a front member, and a rear door, said floor member defining spaced, elongated blind recesses in a rear end thereof that extend in parallel with said left and right side members for receiving elongated lift lugs of a lift assembly, and respective attachment means on opposite sides near a front end thereof.

15. The container transfer system as defined in claim 14, wherein said attachment means comprise respective D-rings.

16. The container transfer system as defined in claim 1, wherein said mast is attached to top ends of said parallel lift rails.

\* \* \* \* \*